United States Patent [19]

Megeid

[11] Patent Number: 5,196,921
[45] Date of Patent: Mar. 23, 1993

[54] DATA TRANSMISSION USING COLOR BURST POSITION MODULATION

[75] Inventor: Mohamed M. A. Megeid, Zurich, Switzerland

[73] Assignee: RCA Thomson Licensing Corporation, Princeton, N.J.

[21] Appl. No.: 625,665

[22] Filed: Dec. 13, 1990

[30] Foreign Application Priority Data

Mar. 22, 1990 [GB] United Kingdom ............... 9006414

[51] Int. Cl.⁵ .................... H04N 9/45; H04N 9/455
[52] U.S. Cl. ................................ 358/19; 358/147; 358/18
[58] Field of Search ............... 358/19, 20, 23, 34, 358/33, 37, 38, 12, 13, 14, 15, 16, 17, 18, 160, 142–147; 380/10–20

[56] References Cited

U.S. PATENT DOCUMENTS

| | | | |
|---|---|---|---|
| 3,723,637 | 3/1973 | Fujio et al. | 178/5.2 R |
| 4,134,127 | 1/1979 | Campioni | 358/16 |
| 4,350,999 | 9/1982 | Mortimer | 358/147 |
| 4,783,699 | 11/1988 | DePaul | 358/142 |
| 4,916,736 | 4/1990 | Ryan | 380/11 |

*Primary Examiner*—James J. Groody
*Assistant Examiner*—Michael H. Lee
*Attorney, Agent, or Firm*—Joseph S. Tripoli; Peter M. Emanuel

[57] ABSTRACT

To transmit digital data in a color television signal, a color burst is transmitted in its standard reference position to represent a first logic state, e.g., a "0" and is shifted by a limited amount from the standard reference position to represent a second logic state, e.g., a "1". More specifically, the "bits" of the data are "read-out" of a register in response to the horizontal synchronization pulses generated in the transmitter and are used as control signals to generate burst flag pulses in the standard or a shifted position depending on whether the bit to be transmitted is a logic "0" or a logic "1". The burst flag pulses are used to insert the color bursts in the back porch portion of the horizontal blanking interval. At the receiver, a burst demodulator extracts the color bursts and determines the position of each color burst to recover the transmitted data.

16 Claims, 6 Drawing Sheets

DATA TRANSMISSION USING COLOR BURST POSITION MODULATION

FIELD OF THE INVENTION

The present invention relates to apparatus and methods for the transmission of digital data utilizing the color burst of a color television signal.

DESCRIPTION OF THE PRIOR ART

In a television system it may be desirable to transmit supplemental information in addition to the conventional television information for reproducing an image and associated audio response. Various techniques have been devised for transmitting data superimposed on the television signal.

U.S. Pat. No. 3,723,637 (T. Fujio et al.), issued on Mar. 27, 1973, discloses a color television system including provisions for transmitting supplemental information in which a supplemental information signal is encoded to form a coded digital signal comprising pulses having a frequency and a phase identical with the frequency and the phase of the color burst signal of the color television picture signal. The coded digital signal is superimposed on the color television signal in place of the suppressed original color burst signal.

U.S. Pat. No. 4,134,127 (A. Campioni), issued on Jan. 9, 1979, discloses a color television system including provisions for transmitting supplemental information in which the supplementary information modulates an additional carrier having a frequency ($F_a$) to form a supplementary information burst. The supplemental information burst replaces the conventional color burst during selected lines.

U.S. Pat. No. 4,350,999 (T. J. Mortimer), issued on Sep. 21, 1982, discloses the transmission of digital information in a color television signal by transmitting different numbers of cycles of the color burst signal. Different numbers of cycles represent different digital values. For example, if two bit words are to be transmitted, the code 00 is transmitted by transmitting eight cycles in the color burst signal. Similarly, the codes 01, 10, and 11 would be transmitted by transmitting nine, ten and eleven cycles, respectively, in the color burst signal.

U.S. Pat. No. 4,783,699 (A. D. DePaul), issued on Nov. 8, 1988, discloses a technique for adding information to a television signal by amplitude modulating of the horizontal synchronizing pulses.

It is desirable to provide a technique which permits the transmission of digital information in a color television signal so that the resulting television signal is compatible with the signal processing used in standard receivers. Thus, the manner in which digital information is superimposed on the conventional television signal should not change any of the synchronizing pulses or affect the automatic color control (ACC) circuitry in a television receiver by varying the width, frequency or amplitude characteristics of the color burst. In addition, the manner in which the digital information is encoded should provide for reliable decoding in the receiver. Thus, e.g., while the technique of transmitting a different number of burst cycles to represent respective digital values described in the Mortimer patent is theoretically compatible with the transmission standards (NTSC) used in the United States, it may in practice present a problem in such operations as ACC because the number of cycles in, and therefore the energy of, the color burst from line to line will vary. In addition it may be difficult in practice to accurately decode the digital data because of the uncertainty in determining the specific number of burst cycles which have been transmitted. This in part is due to the inevitable presence of noise components which may be counted, and in part due to the shape of the extracted burst signal due, e.g., to low pass filtering, which makes counting cycles unreliable.

SUMMARY OF THE INVENTION

One aspect of the present invention is directed to an encoding method and apparatus for superimposing digital data onto a color television signal by modulating the position of the color burst component. Another aspect of the invention is directed to decoding method and apparatus for demodulating the position modulated color burst component to recover the transmitted data.

More particularly, the encoding method comprises the steps of transmitting a color burst of the television signal in a first position to represent a first digital value (e.g., a logic "0"), and transmitting a color burst of the television signal in a position which is shifted from the first position by a predetermined period of time to represent a second digital value. The first position desirably corresponds to the standard or nominal position of the color burst.

The encoding apparatus comprises a burst position modulator for generating an output control signal comprising burst flag pulses. Each burst flag pulse comprises a first position to indicate a first digital value or a second position which is shifted by a predetermined period of time from the first position to indicate a second digital value. Apparatus for inserting a predetermined number of cycles of a color subcarrier signals generated by a conventional color subcarrier oscillator is responsive to each burst flag pulse for inserting a color burst into the composite color television signal to be transmitted at a time determined by the respective burst flag pulse.

The invention will be better understood from the following more detailed description taken with the accompanying drawings and claims.

DETAILED DESCRIPTION

Figure 1:
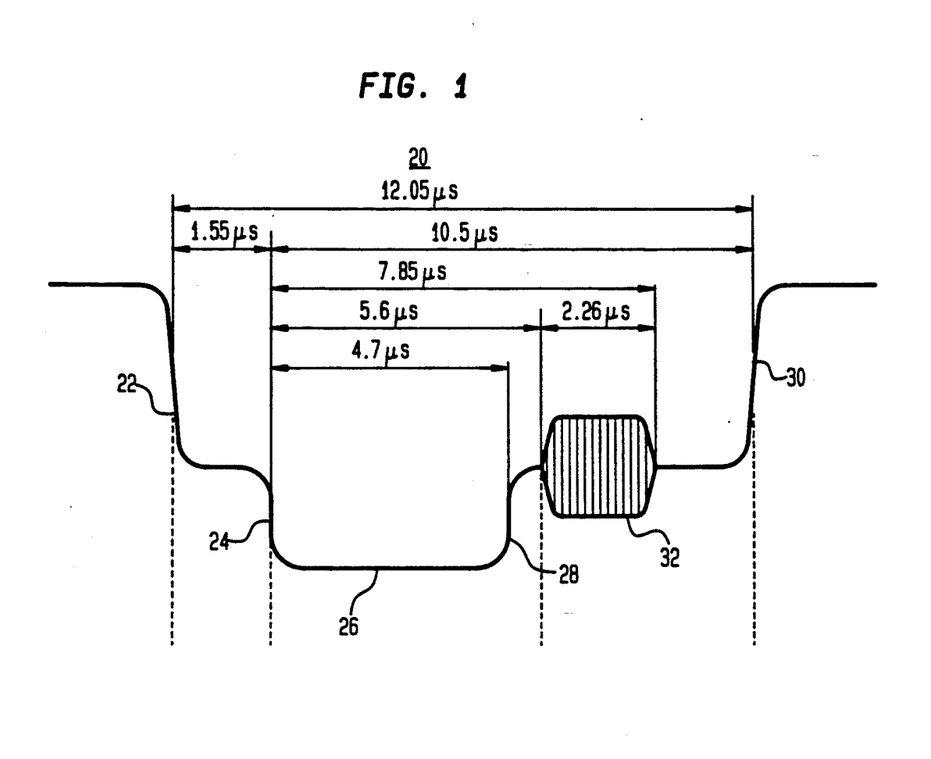
FIG. 1 illustrates a line blanking interval including a color burst positioned as found in a standard PAL (phase alternating line) television signal and which may be used to indicate a first logic value (e.g., 0) in accordance with an aspect of the present invention.
Figure 2:
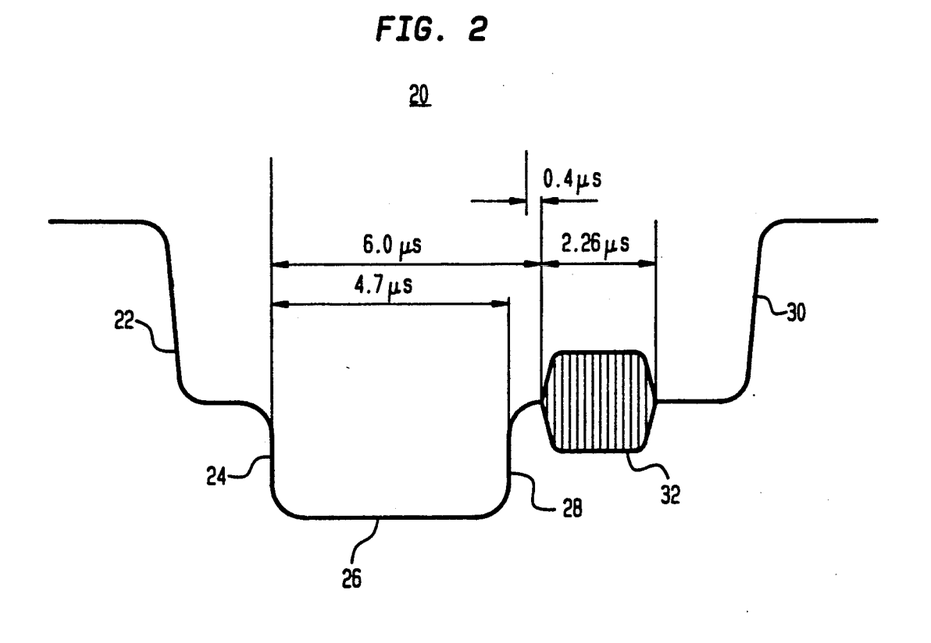
FIG. 2 illustrates the line blanking interval of FIG. 1 including a color burst which has been position modulated (shifted in time) to indicate a second logic bit (e.g.,1) in accordance with an aspect of the present invention.

The television transmission systems used in most countries throughout the world conform to one of three main formats, namely: the National Television System Committee (NTSC) standard, the Phase Alternating Line (PAL) standard, or the Sequential Color With Memory (SECAM) standard. The NTSC standard uses 525 lines per frame to form the television picture while the PAL and SECAM standards use 625 lines per frame. During the line scanning process, retrace lines are prevented from being observed by applying blanking pulses to the picture tube during blanking intervals. The manner in which the present invention is applicable to the PAL standard is indicated in FIGS. 1 and 2. It will be understood that the present invention is applicable to the NTSC and SECAM standards in similar fashion.

Referring now to FIG. 1, there is shown a line blanking interval 20 used in the PAL standard. The leading edge 22 of a line blanking interval 20 precedes a leading edge 24 of a horizontal synchronizing pulse 26. The region between the leading edge 22 of the line blanking interval and the leading edge 24 of the horizontal synchronizing pulse 26 is termed the "front porch", while the region between a trailing edge 28 of the horizontal synchronizing pulse 26 and a trailing edge 30 of the line blanking interval is termed the "back porch". A color burst 32 of eight or more cycles (depending on the standard used) of a color subcarrier signal at a predetermined reference position is located in the "back porch" portion for synchronizing the color subcarrier oscillator of a television receiver used for color demodulation. In the transmitter, a line-frequency gating pulse (not shown) selects the appropriate number of cycles (e.g., 10±1 cycles for PAL and 8 or more for NTSC) to derive the color burst.

Referring now to FIG. 2, there is shown the line blanking interval 20 of FIG. 1 with the color burst 32 shifted in time by a predetermined amount in accordance with the present invention. More particularly, if the gating pulse of the transmitter (referred to later as a burst flag) is shifted in time relative to the horizontal synchronization pulse 26 by a time interval T, then the sample color burst 32 is also shifted by the time interval T and may be utilized, as will be described in detail below, to transmit digital data. It is noted that a shifted color burst 32 retains the phase and frequency information provided by the color subcarrier signal generated in the transmitter and does not affect color demodulation at the receiver as long as the time shift is kept within specific limits. Color demodulation involves, among other things, extracting the color burst from the composite television signal in response to a color burst gating pulse generated in the receiver, synchronizing the phase and frequency of a color subcarrier signal generated by a color oscillator with the extracted color burst and controlling the amplitude of the chrominance component of the composite television signal in accordance with the amplitude of the extracted color burst (referred to as automatic color control or ACC). The gating pulse generated in the receiver is positioned with regard to the standard or reference position of the color burst but is relatively wide, being only narrow enough to exclude picture and synchronization components. Therefore, the time shift only needs to be restricted enough to ensure that the transmitted color burst falls within the color burst gating pulse generated in the receiver. If the time shift is not restricted color demodulation functions such as ACC may be adversely affected. A time shift of, e.g., 400 nanoseconds (ns) has been found to be appropriate for both the NTSC and PAL standards. In terms of the number of cycles of the color subcarrier, 400 ns corresponds to about 1.7 cycles for the PAL standard and about 1.4 for the NTSC standard.

In accordance with an aspect of the present invention, digital data can be sent, e.g., in the PAL television signal, by transmitting a color burst 32 in its reference position at t=0 (as shown in FIG. 1 as 5.6 us after leading edge 24) to represent a first digital data signal (e.g., a logic 0), and shifted by t=T to represent a second digital data signal (e.g., a logic 1). A time shift of the color burst 32 of the exemplary 0.4 us (400 ns) as is shown in FIG. 2 is used to represent a logic 1. With such burst position-modulation technique, each color burst can be used to both synchronize the subcarrier reference oscillator in the receiver, and to transmit digital data at the rate of one bit of digital data per color burst 32. For the PAL standard television signal it is possible to send digital data at a rate of 15.175 kbit/sec since there are 607 bursts per frame and 25 frames per second.

Figure 3:
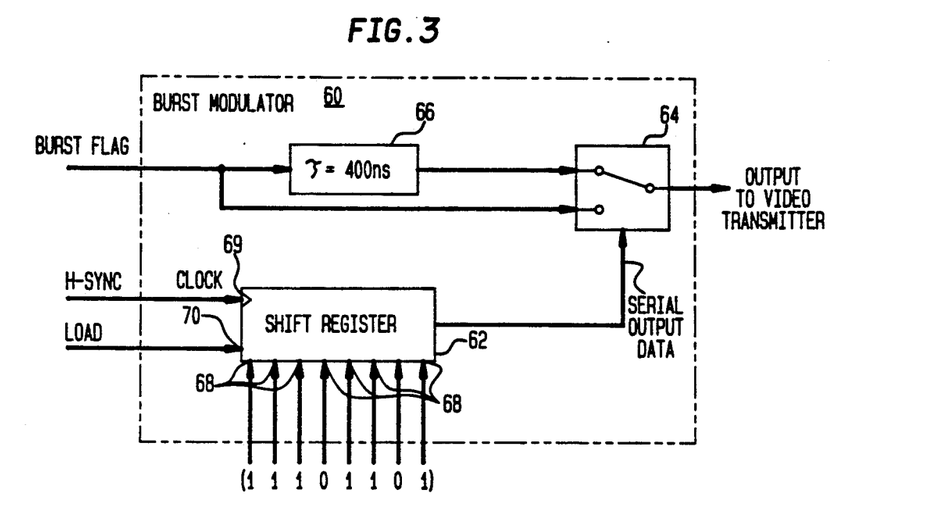
FIG. 3 is a block diagram of a burst modulator according to an aspect of the invention for use in a transmitter to produce the line blanking intervals shown in FIGS. 1 and 2 in accordance with an aspect of the present invention.
Figure 4:
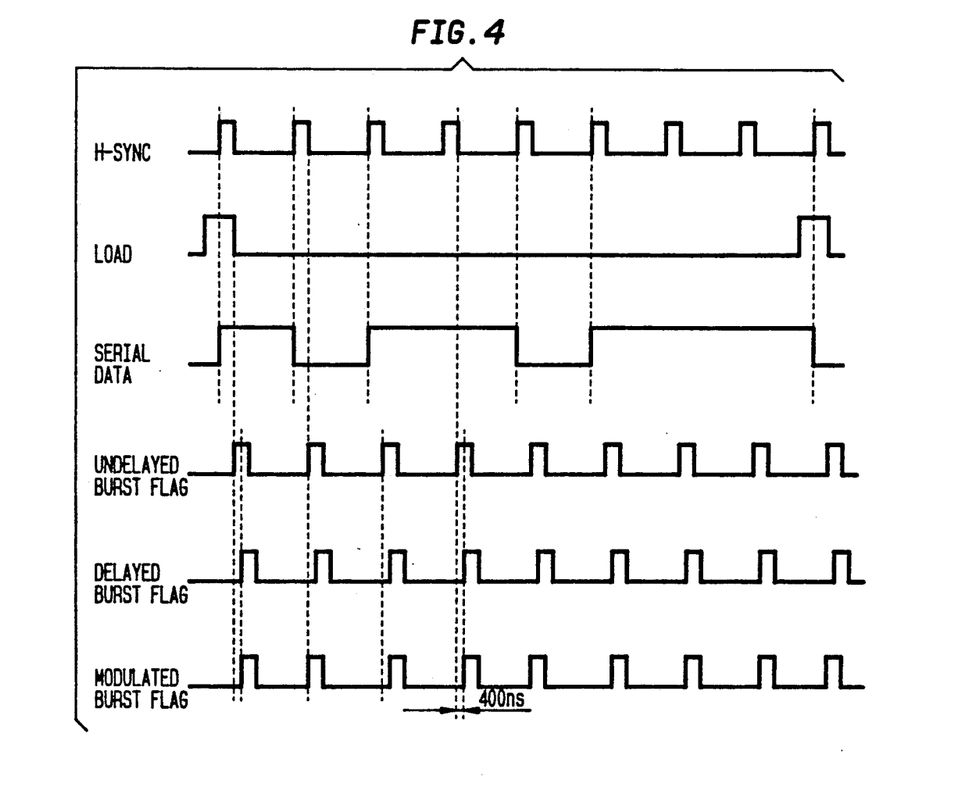
FIG. 4 illustrates exemplary waveforms occurring at various points throughout the burst modulator of FIG. 5.

Referring now to FIG. 3, there is shown within a dashed-line rectangle, a block diagram of a burst modulator 60 for generating burst flag pulses used for position modulating the color bursts of a television signal as shown in FIGS. 1 and 2 in order to transmit digital data via such color bursts in accordance with an aspect of the present invention. The burst modulator 60 is simple in construction comprising a shift register 62, a switching element 64 and a delay element 66. FIG. 4 shows typical waveforms of signals found at various points within the burst modulator shown in FIG. 3.

In operation, the "bits" of the digital data to be transmitted are entered into the shift register 62. By way of example, such digital data can be in the form of non-return-to-zero (NRZ) encoded data. For purposes of illustration, it will be assumed that the digital data is the eight-bit word 11101101. The bits of the digital data are coupled in parallel fashion to inputs 68 (left to right) of shift register 62. A load pulse is coupled to a load input 70 of shift register 62 at a predetermined time interval in order to load parallel data bits at inputs 68 into shift register 62. For the exemplary 8-bit digital data word, one load pulse is produced for every eight sequential horizontal synchronization pulses applied to a clock input 69 of shift register 62. A typical load pulse sequence for the exemplary 8-bit digital data word is shown in the second line from top in FIG. 4. For example, the leading edge of the leftmost load pulse causes the exemplary digital data word of 11101101 to be loaded into the shift register 62.

The shift rate of shift register 62 is determined by the rate of the horizontal synchronization pulses applied to the clock input 69 of register 62. These horizontal synchronization pulses are gated in a manner to only correspond to those lines of the television picture signal which contain color bursts usable for transmitting digital data. A typical horizontal synchronization pulse sequence coupled to the clock input 69 of shift register 62 is shown in the top line in FIG. 4. With a PAL television signal, since the color bursts are omitted during the vertical blanking interval, a field rate pulse having a duration of 9 lines would gate the clock signal at input 69 of the shift register 62 so that the horizontal synchronization pulses are removed during the vertical blanking interval. However, with a NTSC television signal, color bursts are not omitted during the entire vertical blanking interval and may therefore be utilized for the transmission of data.

The horizontal synchronization pulses at input 69 of shift register 62 cause the stored data word to be shifted out one bit at a time from the right-hand side of shift register 62 in a serial NRZ sequence. The NRZ sequence at the output of shift register 62 for the exemplary 8-bit digital data word 11101101 is shown in third line from the top in FIG. 4. The bit sequence is synchronized to the leading edges of the horizontal synchronization pulses provided at input 69 of shift register 62. The bit sequence is provided as a control input signal to the switching element 64.

The switching element 64 includes a first input for receiving an undelayed burst flag signal, a second input for receiving a delayed burst flag signal which has been delayed in the delay element 66 by the exemplary 400 ns, a third input for receiving a control input signal from the shift register 62, and an output. The undelayed burst flag signal coupled to the first input of switching element 64 is shown in FIG. 4 in the fourth line from the top, while the delayed burst flag signal coupled to the second input of the switching element 64 is shown in FIG. 4 in the fifth line from the top. Switching element 64 can be implemented by, for example, NOR-gates, fast CMOS analog switches, or any other suitable switching element. The output signal of the switching element 64 provides sequential position-modulated burst flag pulses. Each of these position-modulated burst flag pulses is used to insert a color burst with a fixed number of cycles (depending on the television standard) into a composite color television signal including luminance and chrominance components at a time (position) determined by the respective burst flag. More specifically, the output signal of the switching element 64 is coupled to a gating circuit (not shown) which selectively passes the output signal of a color subcarrier oscillator (not shown) to a combining network (not shown) in response to the burst flag pulses. The combining network combines the position-modulated color burst with the composite television picture signal including luminance, chrominance and synchronization component. The gating circuit, color subcarrier oscillator and combining network are conventional elements of a color television transmitter and are therefore not shown. It is noted that in the present invention, the number of cycles and the phase of the color subcarrier signal which is inserted (except for the line-by-line phase inversion used in the PAL standard) remains the same for each line.

In operation, the burst flag pulses produced at the output of switching means 64 are position-modulated in accordance with the serial digital data control signal from the shift register 62. The switching element 64 selects the delayed burst flag signal present at its first input every time a logic 1 appears at the output of shift register 62, and selects the undelayed burst flag signal present at its second input every time a logic 0 appears at the output of shift register 62. The output modulated burst flag signal from the switching element 64 for the exemplary 10110111 data output sequence from shift register 62 is shown in the bottom line of FIG. 4. More particularly, the leftmost modulated burst flag signal is shown in the bottom line of FIG. 4 as being delayed by 400 ns to represent the first bit (e.g., a logic 1) of the data sequence from the shift register 62, the second modulated flag signal is shown as being undelayed to represent the second bit (e.g., a logic 0) of the data sequence, etc. It is to be noted that no phase-corrected shaping filter or data synchronization information is required in the burst-position modulator 60 (as is required, e.g., for transmitting Teletext in a PAL television signal) because line synchronization is already available in television receivers and can be used to provide timing reference information.

Figure 5:
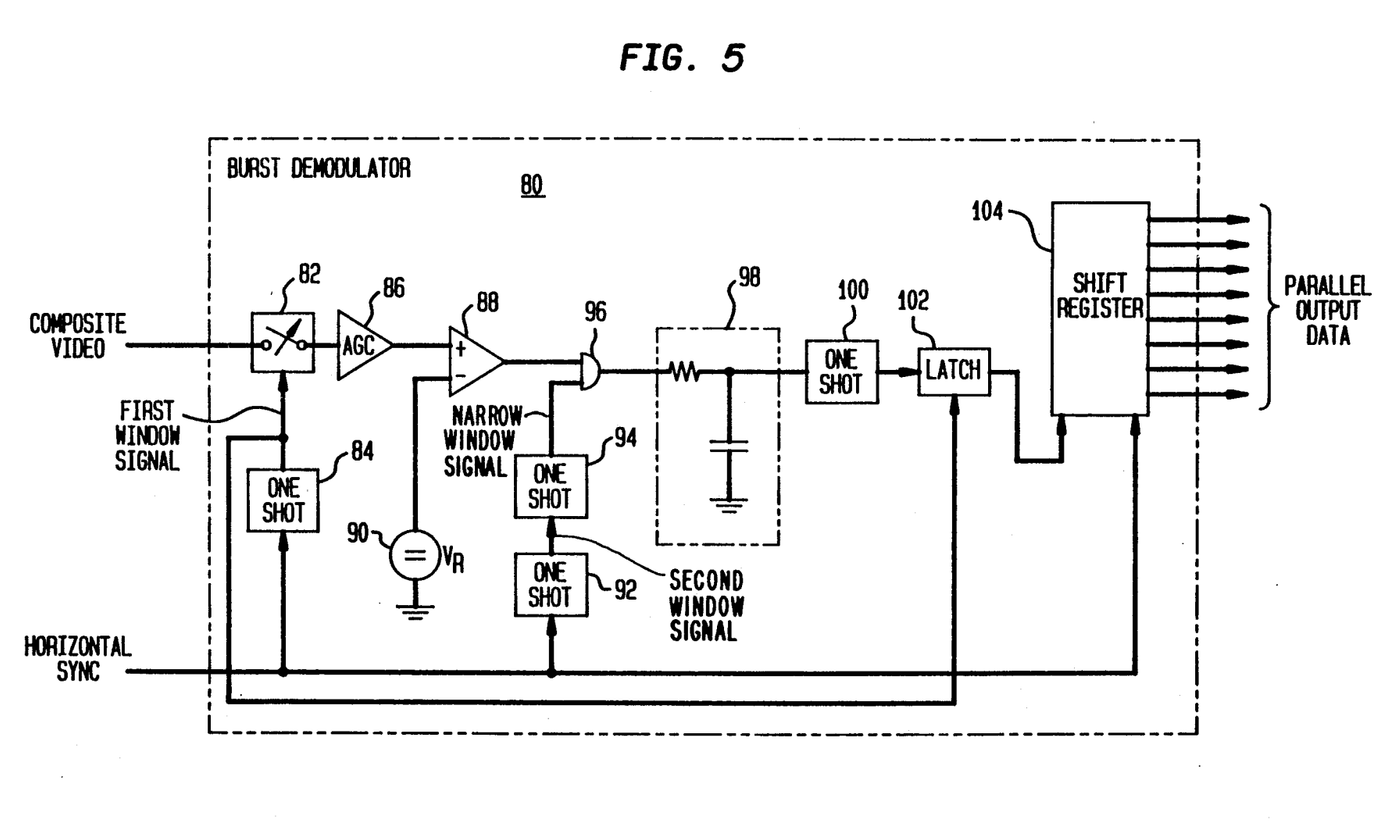
FIG. 5 is a block diagram of a burst demodulator according to an aspect of the invention for use in a receiver for recovering the digital data encoded by the burst modulator of FIG. 3.
Figure 6:
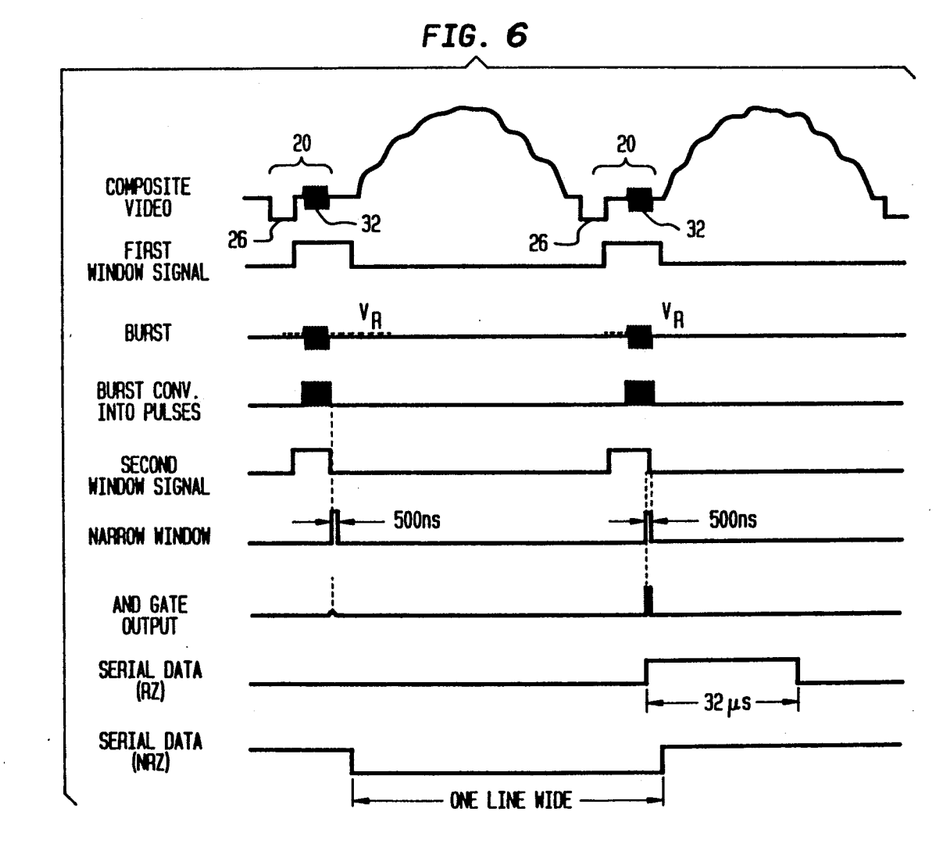
FIG. 6 illustrates exemplary waveforms occurring at various points throughout the burst demodulator of FIG. 5.

Referring now to FIG. 5, there is shown within a dashed-line rectangle, a block diagram of a burst demodulator 80 in accordance with an aspect of the present invention for use in a television receiver. Burst demodulator 80 is used for decoding the position-modulated color burst signals produced by a transmitter using a burst modulator such as burst modulator 60 of FIG. 3. FIG. 6 shows typical waveforms of signals that are found at various points in the burst demodulator 80.

A composite video signal, including position-modulated color bursts, produced by a video demodulator (not shown), in addition to being coupled to a video signal processing section (not shown) which processes the luminance, chrominance and synchronization components of the composite video signal in conventional fashion, is coupled to a first input of a switching or gating element 82 of burst demodulator 80. The waveform of a typical composite video signal received at the first input of the switching element 82 is shown in the upper line of FIG. 6 and includes the line blanking intervals 20 including the horizontal synchronization pulses 26 and the position-modulated color bursts 32 as shown in FIGS. 1 and 2.

A first one-shot circuit 84 is responsive to horizontal synchronization pulses produced in the signal processing section of the television receiver to generate a first window signal including pulses of a predetermined width. The waveform of the window signal is shown on the second line from the top in FIG. 6. One-shot circuits are also known as monostable multivibrators. A trigger signal (such as the trailing edge of a horizontal synchronization pulse) drives the multivibrator circuit into an unstable state where it remains for a predetermined time before returning to a stable state. The first window signal pulses coupled to the input of the switching element 82 have a width wide enough to cover the entire duration of either a color burst in the first or reference position or a color burst in the second position. The output signal of the switching element 82 includes a sequence color bursts without any picture or synchronization information. A typical waveform for the output signal of switching element 82 is shown in the third line from the top in FIG. 6. An automatic gain control (AGC) amplifier 86 is used to regulate the amplitude of the color bursts produced at the output of the switching element 82 because the amplitude of the received color bursts depends on several factors such as the antenna response, tuner-IF response and fine tuning conditions.

The output signal of AGC amplifier 86 is coupled to a first input (e.g., the "+" input) of an analog comparator 88, while a reference voltage $V_R$ (having a level indicated in the third line from the top in FIG. 6) provided by a voltage source 90 is coupled to a second input (e.g., the "−" input) of comparator 88. The output signal of the comparator 88 is a TTL-compatible pulse train in which the positive-going portion of each cycle of the burst component has been clipped at the TTL-level to form a respective pulse. The waveform of a typical output signal of comparator 88 is shown in the fourth line from the top in FIG. 6.

A second one-shot circuit 92 is responsive to the horizontal synchronization pulses to produce a second window signal including pulses whose width is chosen so that the falling edge of this second window signal is approximately coincident with the end of the unmodulated color burst. The waveform for the second window signal is shown in the fifth line from the top in FIG. 6. A third one-shot circuit 94 is triggered by the falling edges of the second window signal pulses to produce respective narrow window signal pulses having a predetermined width of, e.g., approximately 500 ns. A typical narrow window signal waveform is shown in the sixth line from the top in FIG. 6.

The narrow window signal produced by the third one-shot circuit 94 and the output signal of comparator 88 are coupled to respective inputs of an AND gate 96. The output signal of AND gate 96 is low for an unmodulated color burst representative of a logic 0. However, in the case where a color burst is shifted to represent a logic 1, approximately the last two cycles of the color burst pass through the AND gate 96. A typical waveform for the output signal of AND gate 96 is shown on the seventh line from the top in FIG. 6.

A filter 98 (shown within a dashed line rectangle) is used to low-pass filter the output signal from AND gate 96 in order to eliminate any spikes which might pass through the AND gate 96 in the case of the transmission of a color burst representing a logic 0. Filter 98 can comprise any suitable circuit such as the RC circuit shown in FIG. 6. A fourth one-shot circuit 100 is only triggered if a logic 1 is transmitted. The width of a resulting pulse at the output of fourth one-shot circuit 100 is selected to be approximately equal to one-half of the time duration of a video line (e.g., 32 us for a PAL television signal). The output signal of one-shot 100 is already the demodulated serial data, but in the form of a return-to-zero (RZ) code. A typical waveform for the output signal of one-shot circuit 100 is shown in the eighth line from the top in FIG. 6.

A latch circuit 102 signal receives the first window signal from the first one-shot circuit 84 at a first input, and the output signal from the fourth one-shot circuit 100 at a second input, and generates serial data in NRZ format at its output. Latch circuit 102 is "clocked" by the trailing edge of the first window signal. A typical waveform for the output signal of latch circuit 102 is shown in the bottom line in FIG. 6. A shift register 104 receives the NRZ-coded serial data from latch circuit 102. Shift register 104 is clocked by the horizontal synchronization pulses. In the exemplary embodiment, in which the data word includes 8 bits, the data in shift register is "read" at the end of 8 horizontal synchronization pulses.

Figure 7:
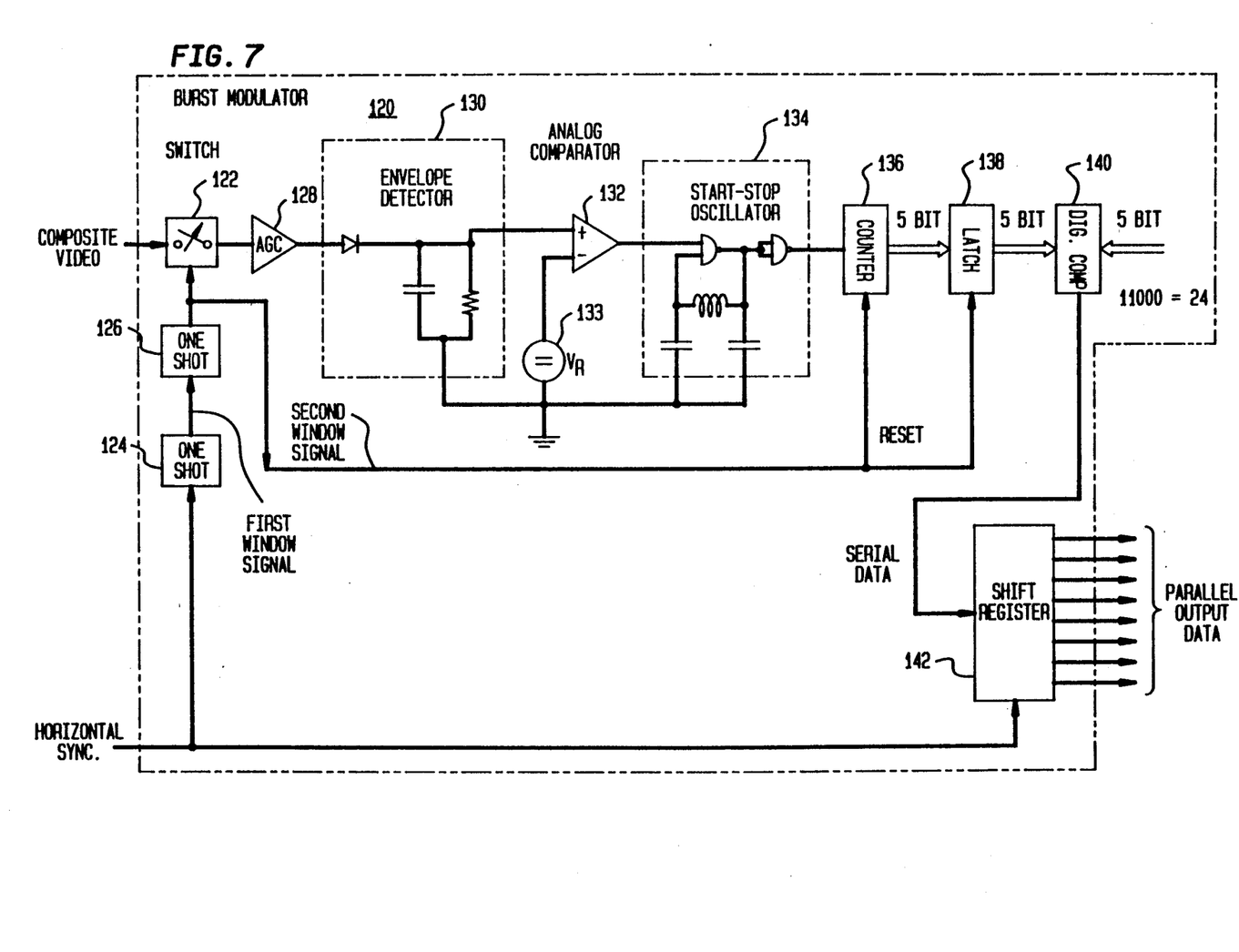
FIG. 7 is a block diagram of another demodulator according to an aspect of the invention for use in a receiver for recovering the digital data encoded by the burst modulator of FIG. 3.
Figure 8:
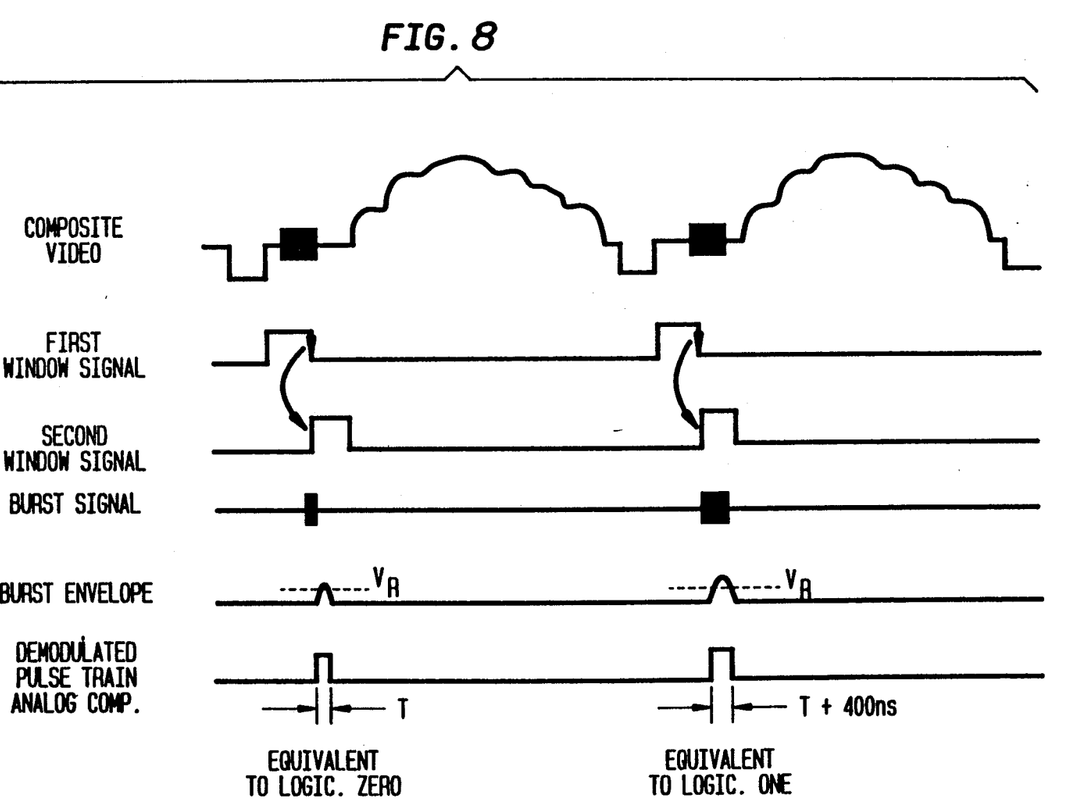
FIG. 8 illustrates exemplary waveforms occurring at various points throughout the burst demodulator of FIG. 7.

Referring now to FIG. 7, there is shown within a dashed-line rectangle another arrangement for a burst demodulator 120 in accordance with an aspect of the invention. FIG. 8 illustrates typical waveforms of signals found within the burst demodulator 120. A composite video signal is received at a first input of a switching or gating element 122 of burst demodulator 120. A typical waveform for a composite video signal is shown in the top line in FIG. 8. A first one-shot circuit 124 generates a first window signal pulse in response to each horizontal synchronization pulse. The first window signal is coupled to an input of a second one-shot circuit 126. A typical waveform for the first window signal is shown in the second line from the top in FIG. 8. The second one-shot circuit 126 is triggered by a falling edge of each pulse of the first window signal. The falling edge of each pulse of the first window signal should be within, and preferably be near the middle of, the position-modulated color bursts representing a logic "1". In response to the triggering signal, the second one-shot circuit 126 generates at an output a second window signal comprising pulses having a width chosen to cover the remaining part of the color burst component, but exclusive of any video information. A typical waveform for the second window signal is shown in the third line from the top in FIG. 8.

With the composite video signal applied to a first input of switching element 122, and the second window signal (acting as a control signal) applied to a second input of the switching element 122, the output signal of switching element 122 consists of a portion of each position-modulated color burst. A typical waveform for the output signal (designated BURST SIGNAL) of the switching element 122 is shown in the fourth line from the top in FIG. 8. As is shown in FIG. 8, the number or cycles in each burst portion at the output of switching element 122 depends on whether or not a logic 0 or a logic 1 was transmitted for the respective line.

The bursts in output signal of the switching element 122 have their amplitude regulated by an AGC amplifier 128. An envelope detector 130 (e.g., comprising a diode, a register and a capacitor as shown within a dashed-line rectangle) is responsive to the amplified bursts from amplifier 128 for generating an output signal including the envelopes of the bursts. A typical burst envelope signal is shown in the fifth line from the top in FIG. 8 for a logic 0 and logic 1.

An analog comparator 132 receives the burst envelopes (as shown in the fifth line of FIG. 8) from the envelope detector 130 at a "+" input and a predetermined reference voltage $V_R$ from the voltage source 133 at a "−" input. Comparator 132 converts the envelope portions to width-modulated pulses, which are amplitude compatible with TTL-logic, as is shown in the last line of FIG. 8. If a logical "0" has a pulse width equal to T, then a logical "1" will have a pulse width equal to T+400 ns, where T is about one-half of the burst width and has a value of, e.g., about 1 us for a PAL television signal.

A start-stop oscillator 134 (shown within a dashed-line rectangle) is enabled by each of the pulses produced at the output of analog comparator 132. Oscillator 134 is shown as comprising first and second serially connected NAND gates and a LC-resonance circuit. However, it is to be understood that any suitable circuit can be used which oscillates only when the output signal from analog comparator 132 goes "high". The number of oscillations in each burst at the output of oscillator 134 varies depending on the width of the respective pulse produced by analog comparator 132, i.e., whether the respective color burst represents a logic 0 or a logic 1. By way of example, a start-stop oscillator 134 having a frequency of 20 MHz would oscillate for 20 cycles (1 us ÷ 50 ns) for a logical "0", and 28 cycles for a logical "1".

A counter 136 counts the number of cycles received from oscillator 134 when the second window signal from the second one-shot circuit 126 is "high" and is otherwise held "reset". The number of cycles counted by counter 136 during each "high" period of the second window signal is stored in a latch 138 when triggered by the falling edge of the second window signal. The count stored in latch 138 is compared in a digital comparator 140 to a reference count value. For the exemplary 20 MHz oscillator, the reference count value can be 24, which is a mid-range value (centered between the 20 and 28 cycles representative of a logical "0" and logical "1", respectively). To this end, a 5 bit signal representing 24 (i.e., 11,000) is applied to a second input of the digital comparator 140. A safety range of ±4 cycles is used in consideration of any possible jitter in the output signal of analog comparator 132 or any drift in the frequency of the start-stop oscillator 134. The output signal of digital comparator 140 is the demodulated serial data because for each count less than 24 the output is "low", and for a count higher than 24 the output is "high". A shift register 142, which has an input coupled to an output of the digital comparator 140, is used to convert the serial data from the digital comparator 140 into parallel data. The shift register 142 is clocked by the horizontal synchronization pulses.

The present invention has advantages over other techniques for transmitting supplemental data with a color television signal since it does not adversely affect the normal operation of a color television receiver because the frequency, phase and amplitude conditions of the color bursts are unaffected by the position shift. In this regard, it is noted that conventional arrangements for color demodulation may be utilized without modification because the slight time shift does not require existing color burst gating circuitry to be modified. In addition, the encoder is very simple and the decoding process is very reliable. Further, the shape of the color bursts due, e.g., to low pass filtering, is not critical.

The present invention concerning data transmission within a television signal using position-modulated color bursts has many applications such as in pay-TV networks and possibly commercial or government communication systems for ensuring that programs are available to viewers which have fulfilled certain conditions, such as proper payment or identification. For example, consider a pay-TV system which basically has two parts. A first part scrambles the video signal in the transmitter so that the program received by receivers cannot be watched by unauthorized viewers. A second part descrambles the video signal in the receiver in accordance with "keying" signals needed to "unlock" the scrambled programs. For example, a predetermined number of TV lines in every field may be reversed. The order in which the lines are reversed is continuously changed at random. In accordance with an aspect of the present invention, the keying signals needed for descrambling in order to identify the scrambled lines may be provided by the position of the color burst. For instance, if the burst is shifted in time (a logic 1), then the following line is reversed. Another application may be the transmission of service information used by the cable operator. This information is normally transmitted over an extra channel which can be saved when using the position-modulation of color bursts for data transmission in accordance with the present invention.

It is to be understood that the specific embodiments which have been described are intended merely to be illustrative of the invention. Various modifications can readily be made by those skilled in the art consistent with the principles of this invention. For example, although in the preferred embodiment the first color burst position is unshifted and therefore corresponds to the standard or reference position, it could also be shifted.

What is claimed is:

1. A method for transmitting digital data in a composite color television signal containing color information modulated on a color subcarrier comprising the steps of:
   (a) transmitting a first color burst of the television signal having the same frequency as the color subcarrier and a predetermined number of cycles in a first position of a first horizontal line relative to a respective horizontal synchronization pulse of said first horizontal line to represent a first digital value; and
   (b) transmitting a second color burst of the television signal having the same frequency as the color subcarrier and the same number of cycles as the first color burst in a second position of a second horizontal line to represent a second digital value, the second position having its beginning delayed from a respective horizontal synchronization pulse of said second horizontal line with respect to the first position by a predetermined period of time.

2. The method of claim 1 wherein in step (b) the predetermined period of time is of a magnitude that does not affect color decoding of the composite color television signal in a receiver.

3. The method of claim 1 wherein in step (a) the first position corresponds to the standard reference position of the color burst.

4. Apparatus for transmitting digital data in a composite color television signal containing color information modulated on a color subcarrier comprising:
   burst modulator means for generating a control signal comprising burst flag pulses for respective ones of successive horizontal lines of said television signal, each burst flag pulse having one of a first position with a first beginning relative to a horizontal synchronization pulse of the respective horizontal line to indicate a first digital value, or a second position with a second beginning which is delayed by a predetermined period of time from a horizontal synchronization pulse of the respective horizontal line with respect to the first position to indicate a second digital value; and
   inserting means responsive to each burst flag pulse of the control signal for inserting a color burst into a respective horizontal line of the composite color television signal at a time determined by the respective burst flag pulse, each of the color bursts having the same frequency as the color subcarrier and having the same number of cycles.

5. The apparatus of claim 4 wherein the predetermined time period is of a magnitude that does not affect color demodulation of the composite television signal in a receiver.

6. The apparatus of claim 4 wherein the first position corresponds to the standard reference position of the color burst.

7. The apparatus of claim 4 wherein the burst modulator means comprises:

means for sequentially providing the bits of the digital data at the rate of the horizontal synchronizing pulses of the composite color television signal;

means for generating a first pulse signal having pulses at the rate of the horizontal synchronizing pulses of the composite color television signal and in a first timed relationship to respective horizontal synchronizing pulses which defines the first position of the burst flag pulses;

means for generating a second pulse signal having pulses at the rate of the horizontal synchronizing pulses of the composite color television signal and in a second timed relationship to respective horizontal synchronizing pulses which defines the second position of the burst flag pulses; and means for selecting a pulse of one of said first and second pulse signals in response to each of the sequentially provided bits of the digital data.

8. The transmitter of claim 7 wherein the means for generating a second pulse signal comprises means for delaying said first pulse signal by the predetermined time period.

9. In a receiver which receives a composite television signal including color bursts which are position-modulated with respect to respective horizontal synchronization pulses in respective horizontal lines in order to transmit digital data, apparatus comprising:

extracting means for extracting a predetermined portion of each color burst from the respective horizontal line; and determining means for determining whether the extracted color burst was transmitted in a first position with respect to the respective horizontal synchronization pulse and representative of a first digital value or in a second position which is shifted from the first reference position by a predetermined period of time and representative of a second digital value;

the determining means including means for generating a window signal comprising control pulses which have a duration timed to encompass substantially none of the color bursts transmitted in the first reference position and a portion of the color bursts transmitted in the second position; and means responsive to the control pulses of the window signal for selectively passing only that portion of the color bursts which occur during respective ones of the control pulses of the window signal to form an output signal.

10. In the receiver of claim 9, the apparatus further comprising generating means responsive to the output signal from the determining means for generating an output signal representative of a number of sequential bits of data.

11. In the receiver of claim 10, the apparatus further comprising converting means for converting a predetermined number of sequential data bits into a parallel digital word.

12. In the receiver of claim 9, the apparatus further comprising means responsive to the output signal of the means for selectively passing for generating a pulse with a predetermined width in response to the portion of a color burst transmitted in the second position passed by the means for selectively passing.

13. Apparatus for transmitting digital data in a composite color television signal comprising:

burst modulator means for generating a control signal comprising burst flag pulses, each burst flag pulse having one of a first position to indicate a first digital value, or a second position which is shifted by a predetermined period of time from the first position to indicate a second digital value;

said burst modulator means including means for sequentially providing the bits of the digital data at the rate of the horizontal synchronizing pulses of the composite color television signal; means for generating a first pulse signal having pulses at the rate of the horizontal synchronizing pulses of the composite color television signal and in a first timed relationship to respective horizontal synchronizing pulses which defines the first position of the burst flag pulse; means for delaying said first pulse signal by a predetermined time period to generate a second pulse signal having pulses at the rate of the horizontal synchronizing pulses of the composite color television signal and in a second timed relationship to respective horizontal synchronizing pulses which defines the second position of the burst flag pulses; and means for selecting a pulse of one of said first and second pulse signals in response to each of the sequentially provided bits of the digital data; and inserting means responsive to each burst flag pulse of the control signal for inserting a color burst into the composite color television picture signal at a time determined by the respective burst flag pulse.

14. In a receiver which receives a composite television signal including color bursts which are position-modulated with respect to respective horizontal synchronization pulses in respective horizontal lines in order to transmit digital data, apparatus comprising:

extracting means for extracting a predetermined portion of each color burst from the respective horizontal line;

the extracting means including means for generating a window signal comprising control pulses having a duration timed to encompass a portion of a color burst received in the first reference position and a portion of a color burst received in the second position; and means responsive to the control pulses of the window signal for selectively passing only the portion of the color bursts which occur during the respective control pulses of the window signal;

determining means for determining whether the extracted color burst was transmitted in a first position with respect to the respective horizontal synchronization pulse and representative of a first digital value or in a second position which is shifted from the first reference position by a predetermined period of time and representative of a second digital value;

the determining means including envelope detecting means for generating envelope signal components having widths which are determined by the widths of the portion of respective ones of the color bursts passed by the means for selectively passing; means for counting the number of cycles of a reference signal dependent on the widths of respective ones of the envelope signal components; and means for comparing the number of cycles of the reference signal counted by the means for counting with a predetermined count to generate a output signal with a first digital value when the number of cycles is below the predetermined count and an output signal with a second digital value when the number of cycles is above the predetermined count.

15. A method comprising the steps of:
(1) encoding digital data in a composite color television signal containing color information modulated on a color subcarrier including the steps of:
   (a) transmitting a first color burst of the television signal having the same frequency as the color subcarrier and a predetermined number of cycles in a first position of a first horizontal line relative to a respective horizontal synchronization pulse of said first horizontal line to represent a first digital value; and
   (b) transmitting a second color burst of the television signal having the same frequency as the color subcarrier and the same number of cycles as the first color burst in a second position of a second horizontal line to represent a second digital value, the second position having its beginning delayed from a respective horizontal synchronization pulse of said second horizontal line with respect to the first position by a predetermined period of time;
(2) decoding the digital data the transmitted composite color television signal including the steps of:
   (a) extracting a predetermined portion of each color burst from each respective horizontal line; and
   (b) determining whether the extracted color burst was transmitted in the first position with respect to the respective horizontal synchronization pulse and is therefore representative of the first digital value, or in a second position which is delayed from the first position by a predetermined period of time and is therefore representative of the second digital value.

16. In a receiver which receives a composite television signal including color bursts which have the same frequency as the color subcarrier, have the same number of cycles from line to line, and have their beginnings delayed by different time periods with respect to respective horizontal synchronization pulses in respective horizontal lines in order to transmit digital data, apparatus comprising:
extracting means for extracting a predetermined portion of each color burst from the respective horizontal line; and
determining means for determining whether the extracted color burst was transmitted with its beginning delayed by a first time period with respect to the respective horizontal synchronization pulse and is therefore representative of a first digital value, or with its beginning delayed by a second time period, different from the first time period, with respect to the respective horizontal synchronization pulse and is therefore representative of a second digital value.

* * * * *